3,780,173
PARTRICIN METHYL ESTER
Tiberio Bruzzese, 7 Via Monte Cervino 20149, and Rodolfo Ferrari, 8 Via Biella 20143, both of Milan, Italy
Filed Nov. 1, 1971, Ser. No. 194,692
Claims priority, application Great Britain, Nov. 3, 1970, 52,271/70
Int. Cl. A61k 21/00
U.S. Cl. 424—122                                1 Claim

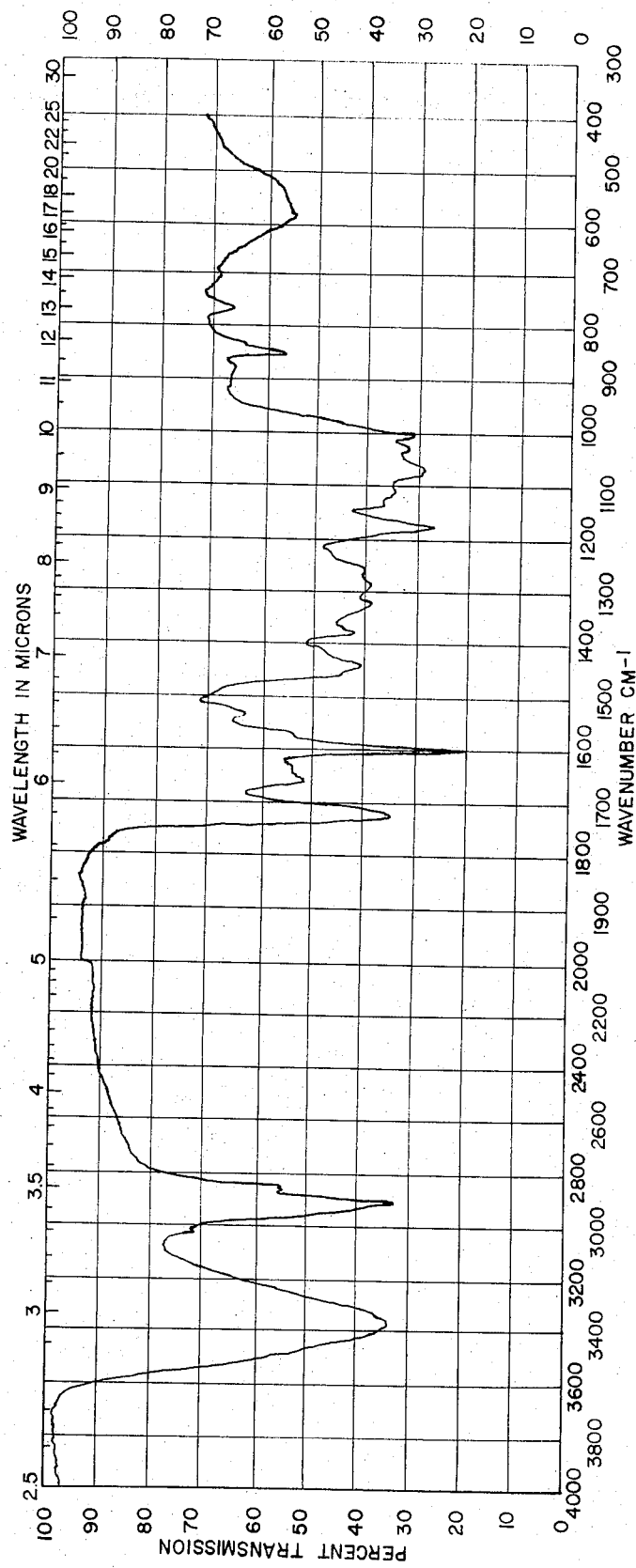

ABSTRACT OF THE DISCLOSURE

Methyl partricin, a new polyenic antibiotic agent is described herein. This material is obtained by the reaction of partricin with diazomethane. It possesses good anti-fungal activity with low toxicity.

---

The present invention is concerned with a new polyenic antibiotic agent, the structural properties of which differ from other antibiotics of this class and which has a very high anti-fungal activity, especially against *Candida albicans* and also has anti-Trichomonas activity.

For ease of reference, the new antibiotic agent is hereinafter referred to by our internal code number SPA–S–160, or by the USAN name—partricin methyl ester.

The present invention is also concerned with a chemical method of preparation of SPA–S–160 from an anti-biotic substance referred to by our code number SPA–S–132, or partricin which is the subject of a co-pending patent application.

Furthermore, the present invention is concerned with a method of isolation and purification of SPA–S–160 and its therapeutic utilization, it having the above-mentioned activities but a much lower degree of toxicity than known polyenic compounds normally used therapeutically.

The polyenic antibiotics are a large class of compounds which are widely produced as metabolites by numerous micro-organisms, such as Actinomycetes.

Due to their highly unsaturated structure, with double conjugated bonds, as demonstrated by their characteristic ultra-violet spectrum, they can be classified as tetra-, penta-, hexa- and heptaenes.

These compounds are often extremely interesting for their high degree of activity toward a variety of fungi and yeasts and therefore, not withstanding generally having only a slight or no activity against bacteria, they are widely used therapeutically. The fact that the sensitive micro-organisms do not easily form strains which are resistant to these polyenic antibiotics and that, on the other hand, there is no satisfactory agents for the cure of infections caused by fungi and yeasts, either in the sulfonamide group of compounds or among the penicillins and tetracyclines, has provided a further interest in these products.

However, the widespread use of these polyenic antibiotics has been hindered by their toxicity which, by parenteral administration, is manifested by headache, nausea, vomiting and by contemporaneous increase of blood levels of urea nitrogen or of non-protein nitrogen and by the appearance of renal damage and haemolytic anaemia.

The new polyenic antibiotic agent, partricin methyl ester, provided by the present invention has a powerful anti-fungal activity, especially against *Candida albicans*, together with an activity against Trichomonas and, at the same time, has low degree of toxicity.

The new antibiotic can be prepared from a new polyenic substance, which we call partricin and which we also refer to by our code number SPA–S–132, by treating a solution of SPA–S–132 in an appropriate organic solvent with only a slight excess of diazomethane, in order to prevent the possible formation of products with major degrees of reaction, then leaving the reaction mixture to stand for a few hours or at least until the evolution of nitrogen has ceased, this evolution being an indication that reaction is taking place, and then precipitating the reaction product by the addition of an appropriate solvent. In addition, we have seen that it is particularly advantageous to carry out the reaction in the presence of basic substances, preferably organic bases such as ammonia and triethylamine, in catalytic or stoichiometric quantities compared to partricin. Although the mechanism of action is not completely known, the presence of these substances seems able to prevent or limit the formation of certain secondary reactional products otherwise revealable with thin layer chromatography techniques, thus yielding a product with high purity and microbiological activity.

The method and the reagent used lead us, according to the known procedures of synthesis reported in the literature, to attribute the material obtained with that of the structure of a methyl ester of the antibiotic partricin; the physical-chemical and analytical properties confirm this. The conditions of reaction, if suitably varied, give the above-mentioned product with unchanged characteristics of purity and yield, which is generally almost quantitative.

The solvents preferably employed for the reaction are dimethyl sulfoxide, dimethyl formamide, dimethyl acetamide, formamide, ethyl Cellosolve, pyridine and numerous other organic solvents which have the ability to dissolve the partricin.

The diazomethane used, which is a poisonous yellow gas and potentially explosive, is generally employed in ethereal solution but there can also be used the above-mentioned solvents, as well as others, such as alcohols and benzene; the presence of an excess of diazomethane is controlled by methods known for similar procedures and reported in literature. The reaction is usually completed in about 1–15 hours and is preferably carried out at a temperature of 0–40° C., generally at ambient temperature.

The most appropriate solvents for the precipitation of the reaction product are diethyl ether, benzene and water added in excess, as well as numerous others which have a low solvent capacity for the product. The product thus obtained, SPA–S–160 or partricin methyl ester, can then be purified, if necessary, by the use of appropriate mixtures of solvents; alternatively, for analytic or preparative purposes, the purification can be made using column chromatography on silica gel, employing different mixtures of solvents as eluents, for example: a mixture of pyridine and petroleum ether in the ratio 8:2.

With regard to the characterization of the new compound, the polyenic structure of partricin remains unchanged, as demonstrated by the characteristic ultraviolet spectrum, so that it can be classified as a heptaene; it differs from partricin by not containing free carboxy groups and by having a "methyl ester" radical, as can be seen from the infra-red spectrum (recorded in suspension in Nujol), which has an absorbance band at 1715 cm.$^{-1}$ due to the stretching vibration of C=O of the ester, this being absent in the starting substance, and in the N.M.R. spectrum recorded in solution of dimethyl sulfoxide, where at 3.25 p.p.m. the characteristic peak of a methyl radical in an "ester" group is present.

Similar to what has been reported in literature for other polyenic anticiotics, it should possess a lactonic macrocyclic nucleus, an amino and some hydroxy groups.

It is also characterized by the fact that it only contains the elements carbon, hydrogen, nitrogen and oxygen in the following approximate amounts by weight:

| | Percent |
|---|---|
| Carbon | 63.3 |
| Hydrogen | 7.8 |
| Nitrogen | 3.2 |
| Oxygen | 24.8 | determined on a sample free of moisture and ash; by the fact that, in ethanol solution at concentrations of about 0.01 mg./ml., it exhibits the following absorbance peaks under ultra-violet light.

| Maximum: | Minimum: |
|---|---|
| 401 m$\mu$ | 391 m$\mu$ |
| 378 m$\mu$ | 367 m$\mu$ |
| 359 m$\mu$ | 348 m$\mu$ |
| 340 m$\mu$ | | and, finally, by the fact that, recording the infra-red spectrum in a potassium bromide disc (FIG. 1, attached) exhibits infra-red absorption maxima at the following frequencies: 3360, 1715, 1640, 1595, 1175, 1060, 1000, 848 and 763 cm.$^{-1}$.

A further means for characterizing the new substance and for distinguishing it from similar polyenic compounds, including the already mentioned partricin, it provided by thin layer chromatography; carrying out the chromatography on silica gel strips and using, as eluant, a mixture of butanol-ethanol-acetone-25% ammonium hydroxide (2:5:1:3), it has an R$f$ value of about 0.8. The spots are easily identified by exposure to ultra-violet light. Particularly interesting is the behavior of the product as regards to light; when measuring the ultraviolet absorption of a diluted solution left exposed for a long time to light, the wholse supectrum is observed to shift to wavelengths about 4 m$\mu$ higher, then modifying the intensity of the absorption peaks. This light-induced modification of the UV spectrum should indicate that SPA–S–160 is not originally found in the "all-trans" form, but there is probably one or more "cis" double bonds which, as in other known heptaenes, easily undergo a light stereoisomerization towards the "trans" form.

The antibiotic partricin methyl ester or SPA–S–160 is a yellow to dark yellow, crystalline solid which is very sparingly soluble in water and aqueous alkali (absence of acid functions) and in ether, petroleum ether, benzene and the like, moderately soluble in other solvents, such as acetone and alcohols, while it is very soluble in dimethyl sulfoxide, pyridine, "Cellosolve," formamide, dimethyl formamide and diacetamide. With some of these solvent, such as methylformamide and pyridine for example, the substance seems to form molecular complexes which give it a major solubility in many aqueous and organic solvent systems.

With regard to microbiological activity, partricin methyl ester or SPA–S–160 has little or no action against Grampositive and Gram-negative bacteria but it is very active against numerous pathogenic fungi, in particular against *Candida albicans*: the minimum inhibiting concentration, determined on 10 strains of Candida, averaged 0.3–0.6 mcg./ml. The substance has shown to be nearly as active against *Trichomonas vaginalis,* where the minimum inhibiting concentration is about 0.6 mcg./ml.

In contradistinction to similar polyenic antibiotics, the toxicity of the new antibiotic agent is very low; the LD$_{50}$ (minimum dose necessary for killing half the animals being tested) is over 2000 mg./kg. in mice after oral administration.

Similar toxicity results are given by the new product in other animal species, for example rats; these doses are exceptionally high when compared with all the previously known polyenic antibiotics.

Local application of partricin methyl ester to normal and scarified rabbit skin, as well as to the conjunctival mucosa and to the corneal epithelium, show it to be prefectly tolerated.

The minium haemolytic concentrations on rabbit red cells are about 40–80 mcg./ml. after 1 hour, which is among the higheset values reported for substances with polyenic structures and especially with heptaneic structures.

The numerous microbiological and pharmacological characteristics above described, make the antibiotic partricin methyl ester extremely interesting therapeutically for combatting many diseases caused by fungal infections in humans, animals and plants. Particularly interesting is the topical application thereof in the form of a tincture or ointment for dermatological use and of suppositories or inserts for vaginal use in fungal infections or in infections due to Trichomonas; in plants the substance can be sprayed on or mixed with fertilizers.

The observation of a low absorption of the new antibiotic through the intestinal wall and its high activity on *Candida albicans* make it particularly useful for combatting intestinal infections by oral administrations, which infections are especially frequent in humans after long-term antibiotic treatments with, for example, the tetracyclines and chloramphenicol, with antibacterial activity. A particularly advantageous form of partricin methyl ester or SPA–S–160 for clinical use is in association with one or more of the above-mentioned wide-spectrum antibiotics to prevent the appearance of fungal infections in the intestinal tract after the usual oral administration.

In addition, it has been observed that the use of certain molecular complexes of SPA–S–160, for example with dimethylacetamide, can improve the absorption of the compound, probably due to the increased capacity of solubilization and diffusion. Therefore, the compound can be of great interest also in combatting numerous general infections after oral or parenteral administration.

For all uses, the new substance is admixed with an appropriate quantity of a pharmaceutically acceptable, solid or liquid vehicle. The preparations include tablets, effervescent tablets, powders, granules, capsules and suspensions in oil or in other forms particularly adapted for oral administration.

The new antibiotic agent can also be administered by the parenteral route, i.e. by injection, using liquid, sterile vehicles. The formulations can include sterile solutions in, for example dimethyl acetamide or ethyl Cellosolve, or suspensions in water or injectable oils.

The following examples are given for the purpose of illustrating the present invention; some examples of pharmaceutical formulations containing SPA–S–160 are also listed.

EXAMPLE 1

35 g. of partricin are dissolved in 280 ml. of dimethyl sulfoxide and 250 ml. of 2% ethereal solution of diazomethane, obtained according to the standard methods reported in literature, are added dropwise. The addition is made while stirring slowly and at ambient temperature, taking the precautions necessitated by the poisonous and dangerous nature of diazomethane. A vigorous reaction immediately take place, with the evolution of nitrogen, which gradually slows down and ceases when the quantity of diazomethane added is in stoichiometric excess.

The mixture thus obtained is left to stand overnight away from light, whereafter a sufficient quantity of ether is added to precipitate the reaction product. This material is collected by filtration and washed first by covering with ether and then digesting it with ether. The substance thus obtained, partricin methyl ester or SPA-S-160, is dried to constant weight under vacuum and at ambient temperature, to give an almost quantitative yield. Small quantities of residual solvent which may be present can be easily removed by washing with water.

If necessary, the substance can be purified by treating it with suitable mixtures of solvents, such as dimethyl sulfoxide-ether, dimethyl sulfoxide-acetone-ether, dimethyl acetamide-water or the like.

EXAMPLE 2

10 g. of partricin are dissolved in 100 ml. of dimethylacetamide and 70 ml. of 2% ethereal solution of diazomethane are added dropwise at the temperature of 26° C. The reaction mixture is kept for 6 hours under slow stirring at the same temperature, then a sufficient quantity of ether is added to precipitate the reaction product. The precipitate is filtered, and washed thoroughly with ether and dried under vacuum to give an almost quantitative yield of the requested SPA-S-160.

EXAMPLE 3

50 g. of partricin are dissolved in 500 ml. of dimethylsulfoxide, then 3 ml. of concentrated ammonium hydroxide are added under stirring, i.e. enough to bring the pH of the solution to 9-9.2, this being measured after dilution of a sample to 1% by adding a mixture of dimethylsulfoxide-water 1:1. Then 350 ml. of about 2% ethereal solution of diazomethane are added to the reaction mixture and kept under slow stirring for 6 hours at room temperature. After which time, excess ether is added to precipitate the reaction product, which is isolated from the solvent mixture and treated with 250 ml. of acetone under stirring, and then with excess ether. The crystalline product in suspension thus obtained is filtered and washed with ether to give the requested product.

EXAMPLE 4

To a solution of 50 g. of partricin in 500 ml. of dimethylsulfoxide is added under stirring an almost stoichiometric quantity of concentrated ammonium hydroxide, i.e. enough to bring the pH of the solution to about 11; measuring this value after dilution of a sample to 1% by adding a mixture of dimethylsulfoxide-water 1:1. Then 350 ml. of about 2% ethereal solution of diazomethane are rapidly added dropwise and one then proceeds as described in Example 3 to obtain the corresponding methyl ester of partricin.

EXAMPLE 5

A solution of 100 g. of partricin in 1000 ml. of dimethyl sulfoxide is prepared and 6 ml. of concentrated ammonium hydroxide and 700 ml. of 2% ethereal solution of diazomethane are added under stirring and at room temperature. The reaction mixture is kept at room temperature under slow stirring for 8 hours; then most of the ether and the excess diazomethane are distilled off under reduced pressure and then excess water is added to precipitate the reaction product. The precipitate is then separated by filtration, washed thoroughly with water and dried under vacuum. The product obtained is slurried with 95% aqueous acetone to extract any impurities and fractions of more toxic matter, then the washed solid is filtered and dried to give high yields of partricin methyl ester, in the form of a dark yellow crystalline solid.

EXAMPLE 6

20 g. of partricin are dissolved in 160 ml. of dimethylsulfoxide then 7 ml. of triethylamine and 140 ml. of 2.3% ethereal solution of diazomethane are added. The mixture is kept under stirring for 6 hours at room temperature and then one proceeds as described in Example 3, obtaining the desired methyl ester of partricin.

EXAMPLE 7

To a solution of 20 g. of partricin in 250 ml. of pyridine is rapidly added dropwise excess 2.5% ethereal solution of diazomethane. The mixture is left to stand overnight at about 25° C., then the reaction product is isolated and purified with the procedure described in Example 1.

EXAMPLE 8

12 g. of partricin methyl ester, obtained with one of the procedures indicated in the above examples, are dissolved in 60 ml. of pyridine and the solution obtained is percolated through a chromatographic column consisting of 400 g. of silica gel (0.05-0.20 mm.) in a mixture of pyridine-petroleum ether (8:2). The same solvent mixture is used in the subsequent elution. During the chromatography, 100 ml. fractions of eluate are collected and pooled after having separately tested their purity by means of thin layer chromatography (Kieselgel $F_{254}$ plate; solvent system: butanol-ethanol-acetone-concentrated ammonium hydroxide, 2:5:1:3). To the solution containing the pure product is added excess ether to precipitate the solute, then the precipitate is collected by filtration and washed thoroughly with ether to give almost pure partricin methyl ester, in the form of a microcrystalline yellow powder. For analytic purposes, it can be further treated, if requested, with suitable mixtures of solvents, such as dimethylsulfoxide-ether, dimethylsulfoxide-water, dimethylacetamide-water.

EXAMPLE 9

Vaginal suppositories

Each vaginal suppositories contains:

| | G. |
|---|---|
| SPA-S-160 (partricin methyl ester) | 0.025 |
| Dimethyl acetamide | 0.065 |
| Polyethylene glycol 1540 monostearate | 1.200 |
| Cetyl alcohol | 0.610 |

EXAMPLE 10

Vaginal suppositories

Each vaginal suppository contains:

| | G. |
|---|---|
| SPA-S-160 (partricin methyl ester) | 0.025 |
| Dimethyl sulfoxide | 0.075 |
| Polyethylene glycol 1540 monostearate | 1.200 |
| Cetyl alcohol | 0.600 |

EXAMPLE 11

Vaginal suppositories

Each vaginal suppository contains:

| | G. |
|---|---|
| SPA-S-160 (partricin methyl ester) | 0.025 |
| Dimethyl acetamide | 0.065 |
| Polyethylene glycol 1540 monostearate | 1.200 |
| Polyethylene glycol 4000 | 0.610 |

EXAMPLE 12

Vaginal suppositories

Each vaginal suppository contains:

| | G. |
|---|---|
| SPA-S-160 (partricin methyl ester) | 0.025 |
| Fatty acid triglycerides | 1.775 |

EXAMPLE 13

Ointment

| Composition: | G. |
|---|---|
| SPA-S-160 (partricin methyl ester) | 3 |
| Dimethyl acetamide | 5 |
| Lanolin | 20 |
| Cetyl alcohol | 32 |
| Oleyl alcohol | 7.5 |
| Sorbitan trioleate | 7.5 |
| Polyethylene glycol 1540 monostearate | 25 |

EXAMPLE 14

Ointment

Composition:

| | G. |
|---|---|
| SPA–S–160 (partricin methyl ester) | 3 |
| Dimethylsulfoxide | 6 |
| Lanolin | 20 |
| Cetyl alcohol | 31 |
| Sorbitan trioleate | 10 |
| Polyethylene glycol 1540 monostearate | 30 |

EXAMPLE 15

Ointment

Composition:

| | G. |
|---|---|
| SPA–S–160 (partricin methyl ester) | 3 |
| Dimethylsulfoxide | 6 |
| Lanolin | 20 |
| Cetyl alcohol | 31 |
| Oleyl alcohol | 10 |
| Polyethylene glycol 1540 monostearate | 30 |

EXAMPLE 16

Ointment

Composition:

| | G. |
|---|---|
| SPA–S–160 (partricin methyl ester) | 3 |
| Petroleum jelly | 70 |
| White oil | 27 |

EXAMPLE 17

The partricin used as the starting material can be produced by growing *Streptomyces aureofaciens* N.R.R.L. 3878 at a temperature from 23–30° C. for about 24 to 168 hours under submerged aerobic conditions, in an aqueous nutrient medium containing an assimilable carbohydrate source and an assimilable nitrogen source. Examples of suitable carbohydrate sources include sucrose, glucose, molasses, starch, dextrin, maize meal and the like. Examples of suitable nitrogen sources include yeast, corn steep liquor, soya bean meal, groundnut flour, ammonium sulfate, ammonium chloride, nitrates, urea and other conventionally known substances. The nutrient medium also contains mineral salts and calcium carbonate as a buffer.

1 kg. of mycelium, obtained by the above-mentioned submerged aerobic growth of *Streptomyces aureofaciens* N.R.R.L. 3878, is isolated after acidification to pH 1.8 to 2 and subsequent filtration. The moist mycelium, preferably containing diatomaceous earth or other suitable filter aid, is suspended in 3 liters of n-butanol and the mixture is brought to pH 9.5 to 10 by the addition of ammonium hydroxide. The butanol fraction is separated by filtration and washed with 1.5 liters of water at pH 1.5, and the n-butanol is concentrated under vacuum to about 150 ml. Rapid cooling precipitates the partricin which is then washed successively with butanol, then by petroleum ether.

What is claimed is:

1. An anti-fungal substance partricin methyl ester characterized by the following properties:
    (a) containing the elements carbon, hydrogen, nitrogen and oxygen in substantially the following average percentages by weight:

| | Percent |
    |---|---|
    | Carbon | 63.3 |
    | Hydrogen | 7.8 |
    | Nitrogen | 3.2 |
    | Oxygen | 24.8 |

(b) characteristic absorption in the infrared region of the spectrum as shown in the figure;
    (c) an $R_f$ value of about 0.8 in a solvent system consisting of butanol (2 parts), ethanol (5 parts), acetone (1 part), and 25% ammonium hydroxide (3 parts);
    (d) ultra-violet absorption peaks at 401 m$\mu$, 378 m$\mu$, 359 m$\mu$ and 340 m$\mu$ in ethanol solution at a concentration of about 0.01 mg./ml.

References Cited

JAMA, 217(9):1233, Aug. 30, 1971.

JEROME D. GOLDBERG, Primary Examiner

U.S. Cl. X.R.

195—80

UNITED STATES PATENT OFFICE
CERTIFICATE OF CORRECTION

Patent No. 3,780,173    Dated December 18, 1973

Inventor(s) Tiberio Bruzzese and Rodolfo Ferrari

It is certified that error appears in the above-identified patent and that said Letters Patent are hereby corrected as shown below:

Column 3, line 45, "wholse" should be -- whole --;

Column 3, line 60, "formamide and diacetamide" should be -- formamide and dimethyl acetamide -- .

Column 3, line 61, "solvent" should be -- solvents --; and

Column 4, line 14, "higheset" should be -- highest --.

Signed and sealed this 6th day of August 1974.

(SEAL)
Attest:

McCOY M. GIBSON, JR.
Attesting Officer

C. MARSHALL DANN
Commissioner of Patents